May 14, 1929.  J. CHMURA  1,713,420
PRESSURE RELIEVING DEVICE
Filed April 4, 1928

John Chmura
INVENTOR

BY *Victor J. Evans*
ATTORNEY

WITNESS:

Patented May 14, 1929.

1,713,420

UNITED STATES PATENT OFFICE.

JOHN CHMURA, OF MARMARTH, NORTH DAKOTA.

PRESSURE-RELIEVING DEVICE.

Application filed April 4, 1928. Serial No. 267,370.

This invention comprehends the provision of means for relieving pressure beneath the surface of the ground due to freezing, an object being to provide upward movement or "heaving" of the surface due to expansion occasioned by such freezing, the invention being especially designed for use in connection with railway tracks for the purpose of preventing movement of the rails and possible disalignment and spreading due to this cause.

With the above and other objects in view, the invention further includes the following novel features and details of construction, to be hereinafter more fully described, illustrated in the accompanying drawing and pointed out in the appended claims.

In the drawing:—

Figure 1:
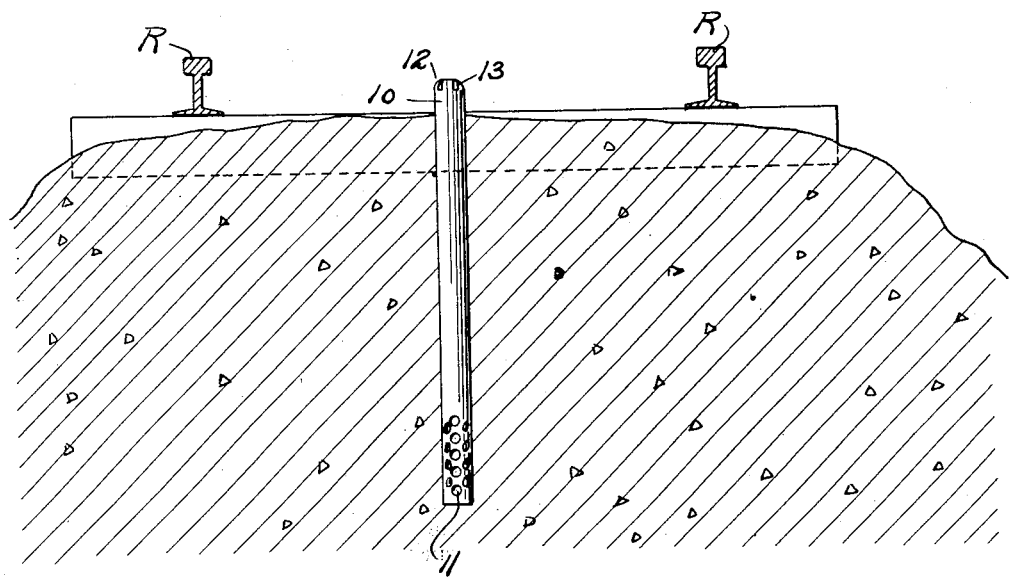
Figure 1 is a sectional view illustrating the invention in use.
Figure 2:
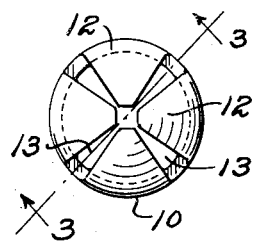
Figure 2 is an enlarged top plan view of the device per se.
Figure 3:
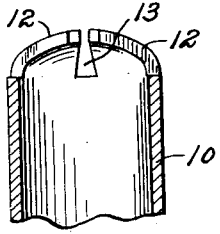
Figure 3 is a section on the line 3—3 of Figure 2.
Figure 4:
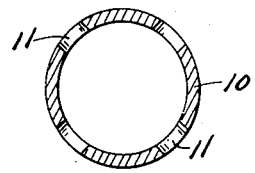
Figure 4 is a section on the line 4—4 of Figure 3.
Figure 1:
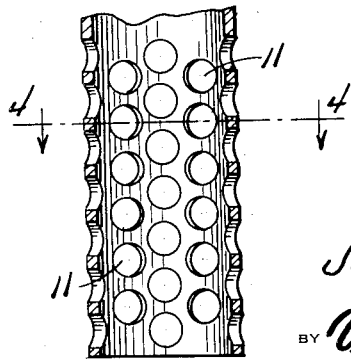

Referring to the drawing in detail wherein like characters of reference denote corresponding parts, the invention is shown in the form of a pipe section indicated at 10 which is designed to be positioned adjacent a railway track and inserted into the ground, the length of the pipe being sufficient to permit its lower end to extend below the frost line with its upper end extended slightly above the surface of the ground. The length of the pipe may of course vary in accordance with the varying depth of frost lines in different localities. While the invention is shown as formed of a pipe section, it is obvious that any suitable means may be used which will provide a passage or conduit from a point below the frost line to the surface of the ground.

The pipe section 10 is preferably positioned substantially centrally between the rails R of the track and a sufficient number are provided to permit them to be spaced longitudinally of the track, preferably a distance equal to two rail sections. This spacing of course may vary should occasion arise.

The pipe sections are open at the bottom and are preferably provided with a plurality of inlet openings 11, the upper ends of the pipe sections being provided with inwardly extending baffles 12 whose adjacent edges are spaced apart to provide outlet openings 13. These baffles may be provided by extending portions of the pipe section inward and act to prevent the entrance of dirt and other extraneous matter which might act to clog the passage. Each pipe section thus provides a passage for the escape of water and air when the pressure in the ballast and roadbed is increased by freezing, so that when freezing occurs, the ground will be prevented from "heaving" or raising upward due to expansion beneath the surface. This will prevent possible disalignment and spreading of the rails such as is frequently occasioned when the ground freezes.

The invention is susceptible of various changes in its form, proportions and minor details of construction and the right is herein reserved to make such changes as properly fall within the scope of the appended claims.

Having described the invention what is claimed is:—

1. Means for relieving pressure beneath the surface of the ground comprising a pipe adapted to be inserted into the ground with one of its ends located below the frost line and its other end above the ground and having inlet openings at its lower end and outlet openings at its upper end.

2. Means for relieving pressure beneath the surface of the ground comprising a conduit adapted to be inserted into the ground with one of its ends located below the frost line and its other end above the ground and having inlet openings at its lower end and restricted outlet openings at its upper end.

3. In combination with a railway track, pipes located adjacent the rails of the track and extending from below the frost line of the ground to the surface of the latter and providing pressure escape passages and means at the upper ends of the pipes to provide baffles.

In testimony whereof I affix my signature.

JOHN CHMURA.